United States Patent
Chang et al.

(10) Patent No.: US 10,678,493 B2
(45) Date of Patent: Jun. 9, 2020

(54) DISPLAYS REPRESENTATIVE OF REMOTE SUBJECTS

(71) Applicant: Hewlett-Packard Development Company, L.P., Houston, TX (US)

(72) Inventors: Nelson L Chang, San Jose, CA (US); Hiroshi Horii, Palo Alto, CA (US); Ian N Robinson, Pebble Beach, CA (US); Alexander Thayer, Palo Alto, CA (US); Jishang Wei, Palo Alto, CA (US); Ji Won Jun, Palo Alto, CA (US); Kevin Smathers, Hayward, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/225,085

(22) Filed: Dec. 19, 2018

(65) Prior Publication Data
US 2019/0121598 A1    Apr. 25, 2019

Related U.S. Application Data

(63) Continuation of application No. 15/388,024, filed on Dec. 22, 2016.

(51) Int. Cl.
*G06F 3/14* (2006.01)

(52) U.S. Cl.
CPC ....... *G06F 3/1454* (2013.01); *G09G 2370/02* (2013.01)

(58) Field of Classification Search
CPC ................... G06F 3/1454; G09G 2370/02
See application file for complete search history.

(56) References Cited

U.S. PATENT DOCUMENTS

| | | | |
|---|---|---|---|
| 6,607,275 B1 | 8/2003 | Cimini | |
| 7,006,952 B1* | 2/2006 | Matsumoto | A63H 9/00 345/420 |
| 8,031,933 B2 | 10/2011 | Se et al. | |
| 9,007,422 B1 | 4/2015 | Kwon et al. | |
| 9,058,681 B2 | 6/2015 | Troy et al. | |
| 9,528,861 B1 | 12/2016 | Haupt | |
| 2004/0103222 A1* | 5/2004 | Carr | G06F 3/002 710/1 |
| 2006/0075356 A1 | 4/2006 | Faulkner | |
| 2007/0088818 A1* | 4/2007 | Roberts | H04L 63/102 709/224 |
| 2007/0217586 A1 | 9/2007 | Marti | |

(Continued)

FOREIGN PATENT DOCUMENTS

WO    WO-2015070881 A1    5/2015

OTHER PUBLICATIONS

Borodulkin, L. et al., "30 virtual 'Smart Home' User Interface", VMS 2002 International Symposium on Virtual and Intelligent Measurement Systems, May 2002, pp. 111-115.

(Continued)

*Primary Examiner* — William A Beutel
(74) *Attorney, Agent, or Firm* — International IP Law Group PLLC

(57) ABSTRACT

In one example of the disclosure, presence data indicative of a presence factor for a remote subject is received from a server. The presence data is analyzed and a display representative of the presence factor is caused at a 3D object. The 3D object includes a 3D element representative of the remote subject.

20 Claims, 10 Drawing Sheets

(56) References Cited

U.S. PATENT DOCUMENTS

| | | |
|---|---|---|
| 2007/0219645 A1 | 9/2007 | Thomas |
| 2011/0010430 A1* | 1/2011 | Wang ................ H04W 4/18 709/217 |
| 2011/0081920 A1* | 4/2011 | Hung ................ G06Q 10/109 455/456.3 |
| 2011/0145590 A1 | 6/2011 | Harada |
| 2012/0212509 A1 | 8/2012 | Benko et al. |
| 2012/0326356 A1* | 12/2012 | Martin ................ G03B 21/62 264/401 |
| 2014/0210947 A1 | 7/2014 | Finn et al. |
| 2015/0042678 A1 | 2/2015 | Alt et al. |
| 2016/0078191 A1 | 3/2016 | Casimiro |
| 2016/0232586 A1* | 8/2016 | Peyman ............ G06Q 30/0601 |
| 2016/0323548 A1 | 11/2016 | Khot |

OTHER PUBLICATIONS

Zhou, G. et al., "Customizing Visualization in Three-Dimensional Urban GIS via Web-Based Interaction," Journal of Urban Planning and Development, Jun. 2006, <http://ascelibrary.org/doi/abs/10.1061/(ASCE)0733-9488(2006)132:2(97)> pp. 97-103.

* cited by examiner

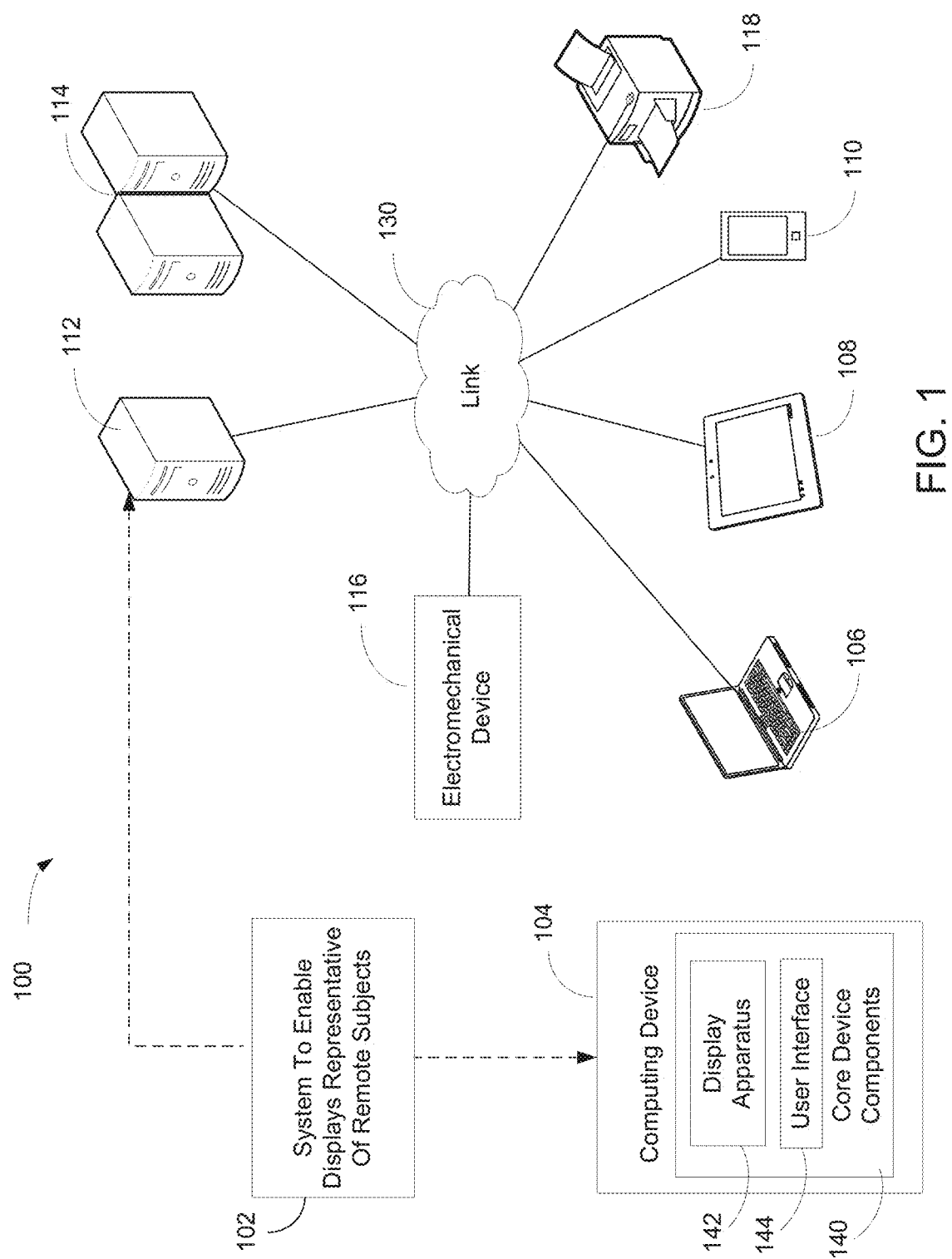

DISPLAYS REPRESENTATIVE OF REMOTE SUBJECTS

BACKGROUND

Human beings are strongly motivated to have a number of close relationships. Studies show humans with close relationships are more likely to have high self-esteem, to be empathetic to others, and to be more trusting and cooperative. Further, feeling connected not only can make one happier, it can add years to a life. Conversely, being separated from a loved one for a prolonged period of time can produce considerable stress and anxiety.

DRAWINGS

FIG. 1 is a block diagram depicting an example environment in which various examples of the disclosure may be implemented.

DETAILED DESCRIPTION

Figure 2A:
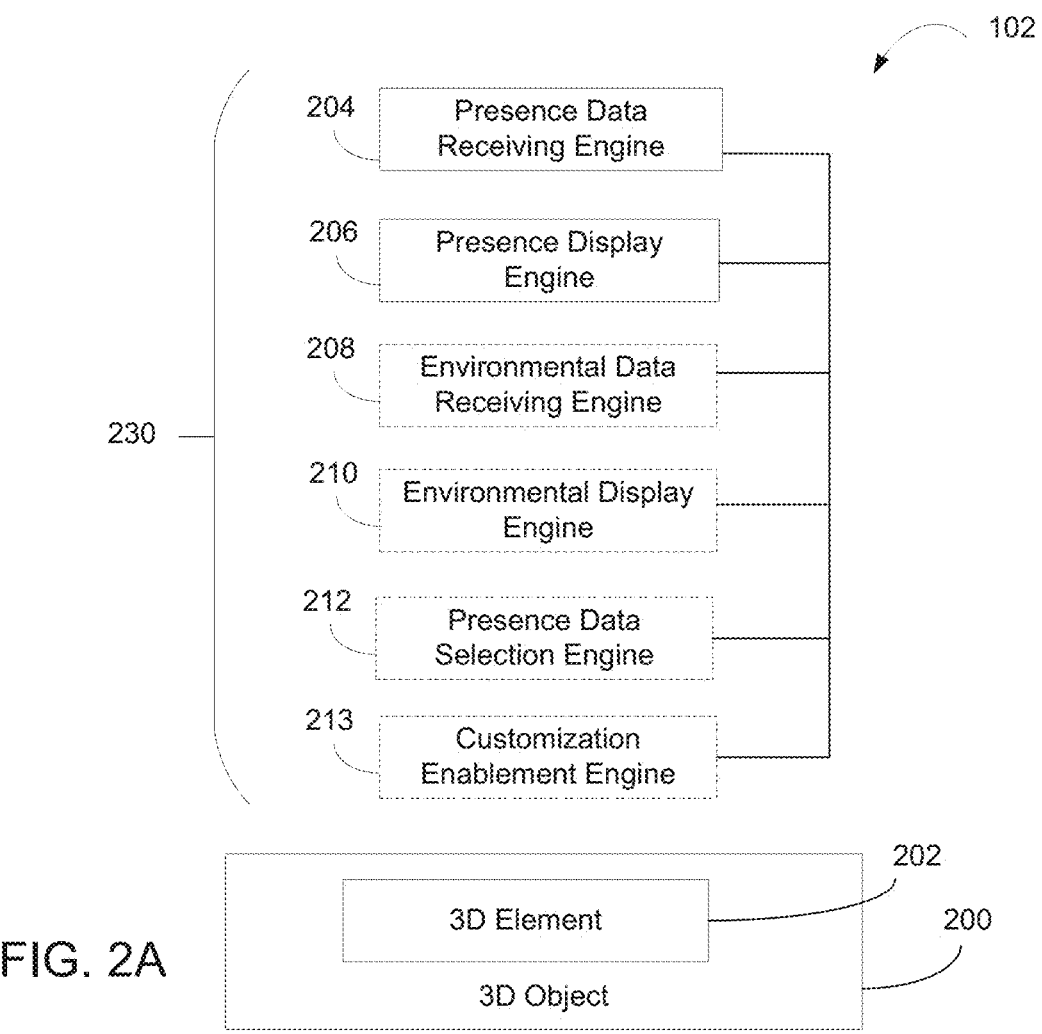
FIGS. 2A and 2B are block diagrams depicting examples of a system to enable displays representative of remote subjects.

When friends and family live in close proximity, close relationships can be developed in any number of ways that involve spending time together. For instance, bonding can occur during time spent together watching television or movies, cooking, eating, playing games, or attending sporting events. When friends or family are far away, telephone calls, letters, post cards, mailed gifts, and travel to visit are ways to stay connected. In this digital age, texting, sending digital photographs, family websites, and social media are also available. However, while these long-distance methods are helpful, they typically involve active participation of the parties for a short period and may not provide a sense of "being together" on a day to day basis.

To address these issues, various examples described in more detail below provide a system and a method to enable displays representative of remote subjects. In one example of the disclosure, a system to enable displays includes a 3D object. The 3D object includes a 3D element representative of a remote subject, e.g., a family member, or a home of a family member. A secure connection may be established between the 3D object and a server. The system is to receive from the server presence data indicative of a presence factor for the remote subject. The system is to in turn analyze the presence data and cause at the 3D object a display representative of the presence factor. In certain examples, the system may additionally receive from a server environmental data indicative of an environmental factor for the remote subject (e.g., weather), and analyze the environmental data to cause at the 3D element a display representative of the environmental factor. In an example, the system may receive a user instruction that authorizes sending of the presence data from the server to the 3D object. In another example, the system may receive a user directive as to which of the presence data will be used to cause the display representative of the presence factor.

In certain examples, the 3D element includes may include a base to be connected to a custom-printed facsimile of the remote subject, e.g., a custom-printed facsimile of a family member's home. In certain examples where the remote subject is a home or other structure, the presence data can be data generated as the result of a monitoring of a security sensor or an automation sensor at the structure. In a particular example the 3D object (referred to in this paragraph as a "first 3D object") may connected to a second or companion 3D object located in a family member's home, and the presence data can be data generated as the result of monitoring of a sensor included within a second/companion 3D object. In examples, the second/companion 3D object located in the family member's home may include a second 3D element that is representative of the home in which the first 3D object is located.

In a particular example in which the remote subject is a house or other structure, the 3D object may be or include a transparent container, wherein the 3D element is a custom-printed representative structure to be situated within the transparent container. In this example, causing at the 3D object a display representative of the presence factor may include causing a lighting effect at or upon the custom-printed representative structure.

In another particular example in which the remote subject is a house or other structure with a room and the 3D element is a model of the structure with a representative room, the presence data may be indicative of user activity in the room. In this example, the system may cause a light to be shown upon or within the representative room of the 3D element to suggest presence of a human in a corresponding room of the actual structure.

In another example of the disclosure, the remote subject may be a human user, and presence data may be data generated as the result of monitoring of health indicators of the human user.

In yet another example in which the remote subject is a human user, 3D object may be a doll figure and the 3D element may be a representation of a head of the user. In this example, the presence factor may be an availability of the user for electronic conversation, and the display to be provided may be a display in which the head of the doll is moved from a head down position to a head up position, or from a head turned position to a head forward position.

In other examples of the disclosure, the system may cause a server to receive presence data indicative of a presence factor for the remote subject (e.g., presence in a room, physical health attributes, etc.), and in turn send the presence data to the 3D object. The 3D object may analyze the presence data and cause a display upon or within the 3D object representative of the presence factor.

In this manner, the disclosed examples provide for an efficient and easy to use method and system to enable displays representative of remote subjects that can provide an ambient sense of connection between distant users via electronically, or electro-mechanically, augmented 3D objects. Users will appreciate the ability to customize appearance of the 3D object and aspects of the 3D object behavior, including controlling what data is sent to a 3D object, and to which 3D objects the data will be sent.

FIG. 1 depicts an example environment 100 in which examples may be implemented as a system 102 for enabling displays representative of remote subjects. Environment 100 is shown to include computing device 104, client devices 106, 108, and 110, server device 112, server devices 114, electromechanical device 116, and printer 118. Components 104-118 are interconnected via link 130. Link 130 represents generally any infrastructure or combination of infrastructures to enable an electronic connection, wireless connection, other connection, or combination thereof, to enable data communication between components 104-118. Such infrastructure or infrastructures may include, but are not limited to, a cable, wireless, fiber optic, or remote connections via telecommunication link, an infrared link, or a radio frequency link. For example, link 130 may represent the internet, intranets, and any intermediate routers, switches, and other interfaces. As used herein, a "computing device" may be a server, computer networking device, chip set, desktop computer, notebook computer, workstation, tablet computer, smartphone, printer, or any other processing device or equipment. As used herein an "electronic connection" between components, e.g., between two computing devices, refers generally to a connection via an electrical conductor that may enable a transfer of data between components. A "wireless connection" between components, e.g., between two computing devices, refers generally to a connection between the components that is not via an electrical conductor and may enable a transfer of data between components. A wireless connection may be via a wireless communication protocol or wireless standard for exchanging data.

Client devices 106, 108, and 110 represent generally a computing device with which a user may interact to communicate with other client devices, server device 112, server devices 114, electromechanical device 116, and printer 118 via link 130. Server device 112 represents generally a computing device to serve a program and corresponding data for consumption by components 104-110 and 114-118. Server devices 114 represent generally a group of computing devices collectively to serve a program and corresponding data for consumption by components 104-112 and 116-118. Electromechanical device 116 represents generally any device which utilizes an electrical signal to create mechanical movement, and/or utilizes mechanical movement to create an electric signal.

Printer 118 is a particular type of electromechanical device, representing generally an electronic device or group of electronic devices that consume a marking agent to produce a printed print job or printed content. Printer 110 includes hardware and programming for providing printing functions. Printer 110 may include an operating system to cause the printer to interpret print data, and a printing element to cause the application of one or more marking agents according to mapping provided by print data. In the case of 2D printing the one or more marking agents may be applied according to the print data mapping to a media and/or to another layer of marking agent previously applied to the media to form an image. In the case of 3D printing the one or more marking agents may be applied according to the print data mapping to a bed of marking agent or other build material, or to a previously applied layer of marking agent or other build material, to thereby form an object. In examples, printer 118 may be, but is not limited to, a liquid inkjet printer, a solid toner-based printer, a liquid toner-based printer, or a multifunctional device that performs a function such as scanning and/or copying in addition to printing. As used herein, a "print job" refers generally to content, e.g., an image, and/or instructions as to formatting and presentation of the content sent to a computer system for printing. In examples, a print job may be stored in a programming language and/or a numerical form so that the job can be stored and used in computing devices, servers, printers and other machines capable of performing calculations and manipulating data. As used herein, an "image" refers generally to a rendering of an object, scene, person, or abstraction such text or a geometric shape.

Computing device 104 represents generally any computing device with which a user may interact to communicate with computing device 104, client devices 106, 108, and 110, server device 112, server devices 114, electromechanical device 116, and/or printer 118 via link 130. Computing device 104 is shown to include core device components 140. Core device components 140 represent generally the hardware and programming for providing the computing functions for which device 104 is designed. Such hardware may include a processor and memory, a display apparatus 142, and a user interface 144. The programming may include an operating system and applications. In examples, computing device 104 may include a display apparatus 142, representing generally any combination of hardware and programming to exhibit or present a message, image, view, or other presentation for perception by a user that can include, but is not limited to, a visual, tactile or auditory display. In examples, the display apparatus 142 may be or include a monitor, a touchscreen, a projection device, a touch/sensory display device, or a speaker. In examples, computing device 104 may include a user interface 144, representing generally any combination of hardware and programming to enable interaction between a user and device 104 such that the user may effect operation or control of device 104. In examples, user interface 144 may be, or include, a keyboard, keypad, or a mouse. In some examples, the functionality of display apparatus 142 and user interface 144 may be combined, as in the case of a touchscreen apparatus that may enable presentation of images at device 104, and that also may enable a user to operate or control functionality of device 104.

System 102, discussed in more detail below, represents generally a combination of hardware and programming to enable displays representative of remote subjects. In some examples, system 102 may be wholly integrated within core device components 140. In other examples, system 102 may be implemented as a component of any of computing device 104, client devices 106-110, server device 112, server devices 114, electromechanical device 116, and/or printer 118. In an example, system 102 may take action based in part on data received from core device components 140 via link 130. In other examples, system 102 may be distributed across computing device 104, client devices 106-110, server device 112, server devices 114, electromechanical device 116, and/or printer 118.

FIGS. 2A, 2B, 3A, and 3B depict examples of physical and logical components for implementing various examples.

Figure 2B:
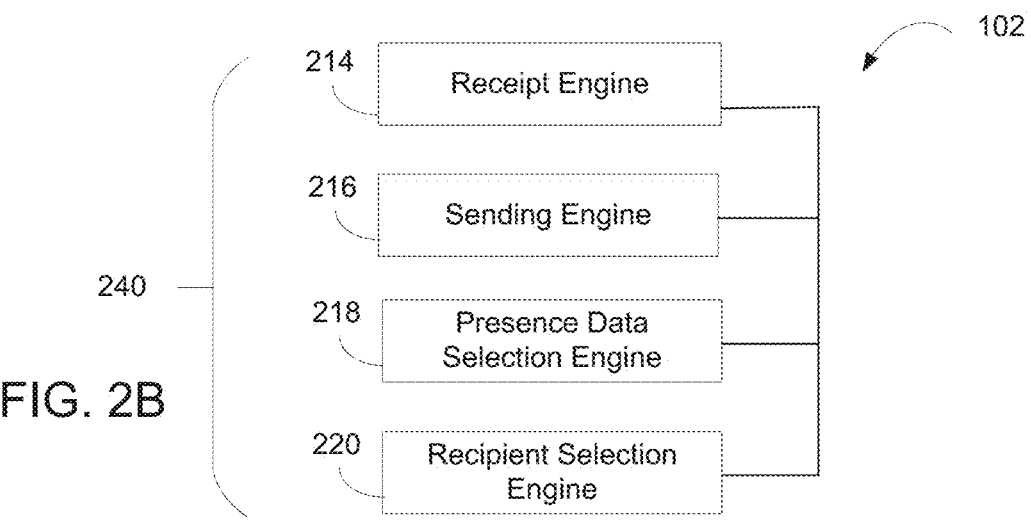

In FIGS. 2A and 2B various components are identified as engines 204, 206, 208, 210, 212, 213, 214, 216, 218, and 220. In describing engines 204-220 focus is on each engine's designated function. However, the term engine, as used herein, refers generally to a combination of hardware and programming to perform a designated function. As is illustrated later with respect to FIGS. 3A and 3B, the hardware of each engine, for example, may include one or both of a processor and a memory, while the programming may be code stored on that memory and executable by the processor to perform the designated function.

FIG. 2A is a block diagram depicting components of a system 102 to enable displays representative of remote subjects. In the example of FIG. 2A, system 102 may be included within a computing device 104. In this example, system 102 includes presence data receiving engine 204, presence display engine 206, environmental data receiving engine 208, environmental display engine 210, presence data selection engine 212, and customization enablement engine 213. In performing their respective functions, engines 204-213 may access a data repository, e.g., any memory accessible to system 102 that can be used to store and retrieve data.

In an example, system 102 includes a 3D object 200. As used herein "3D object" refers generally to any physical object that occupies three dimensional space. The 3D object 200 is to include a 3D element 202 representative of a remote subject. As used herein "3D element" refers generally to a part or portion of the 3D object that is a physical element and occupies three dimensional space. As used herein "remote subject" refers generally to an article or person that is removed from the 3D object. In various examples, the remote subject may be home, office building, or other structure at which a friend or family member lives. In other examples, the remote subject may be friend or family member.

In examples, the 3D element 202 may include a base to be connected to a custom-printed facsimile of the remote subject. In examples the facsimile of the remote subject is to be custom-printed utilizing a 2D or 3D printing device and attached to the base. In examples, 3D object 200 may include electronics or actuators to cause lighting changes, projection of images, and other visual or auditory effects at the 3D object. In certain examples, some or all of such effects electronics or actuators may be included within the base, e.g., as an effects or actuator module. In certain examples, the 3D object 200 may include, or be situated within, a projector device that is to cause lighting effects at or upon the 3D object. As used herein "actuator" refers generally to any component, e.g., a component of a 3D object or 3D element, that is responsible for moving or controlling a mechanism or system. In examples, the actuator might, in response to receipt of a control signal, cause movement of a portion of the 3D element 202 or other part of the 3D object 200.

In certain examples, the 3D object 200 may include a transparent container, with the 3D element 202 being wholly or partially displayed within the transparent container so as to be visible to a human user. As used herein, "container" refers generally to a component that fully or partially surrounds an item. In one example, the container may fully surround the 3D element 202 of the 3D object 200. In another example, the container may be an open container that partially surrounds the 3D element 202 of the 3D object 200. In certain examples in which the 3D element includes a base, the container may surround the base. In other examples in which the 3D element includes a base, the base may be wholly or partially outside the container. As used herein, a "transparent" container refers generally to a container that is clear, invisible, or substantially clear or substantially invisible to a human user. In a particular example, the transparent container may be spherical in shape, with a 3D element 202 representative of a structure or scene situated within the transparent container such that the 3D object 200 in its entirety resembles a snow globe. In other examples, 3D object 200 may not include a transparent container, and may resemble a diorama that includes the 3D element without a snow globe type effect.

Presence data receiving engine 204 represents generally a combination of hardware and programming to receive from a server presence data indicative of a presence factor for the remote subject represented by the 3D element 202. As used herein "data" refers generally to representations in the form of digital electrical signals (including, but not limited to representations of quantities, characters, and symbols) upon which operations may performed by a computer (e.g., including, but not limited to read, write, and transmit operations). As used herein "server" represents generally any computing device that is physically separate from or remote to 3D object 200. As used herein, a "presence factor" refers generally to an attribute or descriptor of the remote subject. In an example in which the remote subject is a home or other structure, a presence factor may be or include an occupant's being in a particular room (e.g., the occupant is in the family room), or engaging in a particular activity (e.g., the occupant is watching a favorite television program). In certain examples, the presence data received from the server may be data generated as the result of monitoring performed by a security sensor or an automation sensor at the structure. For instance, data regarding an occupant's movement from room to room throughout the structure could be data originating from a home security system installed at the structure, wherein the data is provided to the server by the entity hosting the home security system.

In an example in which the remote subject is a human being, a presence factor may be or include the individual's health indicators or health attributes. In this manner, the individual can have the confidence that a trusted family member with the 3D object 200 is can be alerted to any sudden changes in health, and the family member with the 3D object 200 can have the confidence through the ambient information provided that the individual is safe and not in distress. In an example, the presence data received from the server may be data that was gathered by a wearable computing device (e.g., a smartwatch or emergency alert lanyard) worn by the human user.

Presence display engine 206 represents generally a combination of hardware and programming to analyze the received presence data received from the server, and to cause at the 3D object 200 a display representative of the presence factor indicated by the presence data. In examples, causing at the 3D object 200 a display representative of the presence factor may include causing a lighting effect at or upon the 3D element 202. For instance, 3D object 200 may include projection components, lighting, and/or actuators that cause lighting or other effects at the 3D object suggestive activity at or of the remote subject.

In an example where the 3D element is a home structure, causing a display indicative of a presence factor may include activating lights in or upon windows of the 3D element home structure depending upon or tied to activity of an occupant of the remote subject home structure, e.g., activating lights in the 3D element model that correspond to the lights on (or motion detection) at the remote subject home structure. A light activated at or upon a front door of a home structure 3D element (or a door actuated to an open or closed position) could indicate whether the actual front door at the home remote subject is open or closed.

In a particular example, the remote subject may be a structure with a first room and the 3D element may be a model of the structure with a first representative room. If analysis of the received presence data suggests user activity in the first room, presence display engine 204 may cause a light to be shown upon or within the first representative room.

In certain examples of the disclosure, system 102 may include an environmental data receiving engine 208 and an environmental display engine 210. Environmental data receiving engine 208 represents generally a combination of hardware and programming to receive from a server environmental data indicative of an environmental factor for the remote subject. In an example the environmental data may be weather data for a geographic area applicable to the remote subject, wherein the environmental data is data originating from a weather service, e.g. a weather service provided by an online weather news provider such as Weather.com, or originating from a weather service provided by a news outlet in the proximity of the remote subject. In examples the server may obtain the environmental data from such services.

Environmental display engine 210 represents generally a combination of hardware and programming to analyze the received environmental data and cause at 3D element 200 a display representative of the environmental factor. For instance, if the remote subject is a home structure and a current environmental presence factor is rain in a predefined vicinity of the home structure, environmental display engine 210 may cause a display at a 3D element 202 representative of the home structure indicative of snow or rain. In an example, a projection device or embedded lighting may be utilized at the 3D object to simulate rain at the remote subject. In another example, the display may be caused via an actuation of mechanical elements of the 3D object to simulate snow or rain. Other environmental factors that might be represented at the 3D object 200 include, but are not limited to, temperature, wind, severe weather alerts, pollen counts, and ultraviolet radiation (UV) indicators.

It should be noted that while the discussion of system 102 frequently refers to receipt of presence data and/or environmental data from a server, the presence data and environmental data may be received from any computing device and the term "server" is intended to include all such possibilities. In certain examples, presence data receiving engine 204 may receive the presence data and environmental data receiving engine 208 may receive the environmental data from a same server or other same computing device, In other examples, presence data receiving engine 204 may receive presence data and environmental data receiving engine 208 may receive environmental data from another 3D object that is a companion object to 3D object 200. In a particular example, if a first 3D object 200 is to be located at a first actual structure, presence data with respect to a remote subject that is at a second actual structure may be data generated as the result of monitoring of a sensor included within a second 3D object to be located at the second actual structure. In an example, the first 3D object 200 may receive the presence data and/or environmental data from a server, wherein the second 3D object provided the presence and/or environmental data to the server. In another example, the first 3D object 200 may receive the presence data and/or environmental data from the second 3D object via link 130, e.g., wherein link 130 is an internet connection.

In certain examples of the disclosure, system 102 may include a presence data selection engine 212. Presence data selection engine 212 represents generally a combination of hardware and programming to receive a user directive as to which of the presence data will be used to cause the display representative of the presence factor. In this manner a user of system 102 may customize the system to display at 3D object 200 a level of information that is appropriate for the remote subject and the user. For instance, a 3D object to be utilized by a parent user for a subject home that represents the parents own home and children's activities may be set to display different types of information than a 3D object utilized by an adult user to maintain a connection with a parent with health or mobility issues.

In certain examples of the disclosure, system 102 may include a customization enablement engine 213. Customization enablement engine 213 represents generally a combination of hardware and programming to enable generation and/or printing of a custom portion of 3D element which is connectable to the object base. In an example, either a user that is in control of 3D object or a user that occupies a household that is the remote subject can supply one or more images of a home from which can be used to generate a custom model. In examples, a user may be prompted by customization enablement engine 213 to outline features on the images that correspond to the connected data. For instance, if a link 130 has been established between 3D object 200 and a server, with a home automation system in communication with the server showing the status of the front door, and the living room, kitchen and bedroom lights, customization enablement engine 213 may prompt the user in control of 3D object 200 to mark the corresponding door and windows on the image(s) that are to be provided to enable rendering of the customized 3D element.

In a particular example, customization enablement engine 213 may generate and/or cause printing of a customized 3D element model based on received image data, so that the customized portion is to fit onto any locating pins etc. on the base, and thereby be situated to properly interact with available lights/actuators etc. For instance, if the base has six multi-color LED's in the base, aligned cavities in the customized portion of the 3D element may direct light from four of the LED's to each of the door and the three windows. In one example, customization enablement engine may send the resulting customized 3D element model to the user in control of 3D object 200 for printing. In another example, customization enablement engine may cause printing of the resulting customized 3D element model at a printer, e.g., printer 118 (FIG. 1). Customization enablement engine 213 may cause the received or determined data-to-LED correspondences to be stored in memory for future use.

It should be noted that while the discussion of system 102 frequently refers to a 3D element that is a representation of a home or structure, in examples of this disclosure the remote subject may be a human user and the 3D element may be representation of the human user. In a particular example, 3D object 200 may be a doll figure, and 3D element 202 may be a representation of a head of the human user. In certain examples the doll may be bobblehead doll or other doll with a moveable head. In an example the presence factor indicated by the presence data may be an availability of the human user for electronic conversation, and presence display engine 206 may cause at the 3D object a display representative of the presence factor wherein the head of the doll is to be moved from a head down position to a head up position, or is to be moved from a head turned position to a head forward position to indicate accessibility to conversation. In a particular example, movement from a head down to a head up position may include an upward rotation of the doll head. In another particular example, movement from a head down to a head up position may include an upward movement or the head, the head and a torso, or the head and the rest of the doll, from a position in which at least the head is hidden or partially hidden to a second position wherein the head is more visible than was the case in the first position. In one example, the movement to the second position may be an upward movement that moves the head of the doll from a first position where the head is in a recession in a platform to a second position where the doll head is raised above the recession.

FIG. 2B is a block diagram depicting components of a system 102 to enable displays representative of remote subjects. In the example of FIG. 2B, system 102 may be hosted by a server device 112 or service devices 114 or any other computing device. In this example, system 102 includes a receipt engine 214, sending engine 216, presence data selection engine 218, and recipient selection engine 220. In performing their respective functions, engines 214-220 may access a data repository, e.g., any memory accessible to system 102 that can be used to store and retrieve data.

In an example, receipt engine 214 represents generally a combination of hardware and programming to receive presence data indicative of a presence factor for a remote subject. In examples, receipt engine 214 may receive the presence data from a security service for a home structure, from a health monitoring service for a human user (e.g., a service in connection with a fitness wearable or emergency alert wearable), or from a companion 3D object that has sensor capabilities (e.g. object detection, motion detection, temperature, etc.).

Sending engine 216 represents generally a combination of hardware and programming to send the presence data to 3D object (e.g., 3D object 200 of FIG. 2A), wherein the 3D object includes a 3D element (e.g., 3D element 202 of FIG. 2A) representative of the remote subject. The 3D object is to analyze the presence data and cause a display, upon or within the 3D object, that is representative of the presence factor. As discussed previously, in examples the presence factors may include, but are not limited to, physical presence in a room in a home, health presence factors, and activity presence factors. In certain examples, receipt engine 214 may, in addition to receiving presence data, receive environmental data indicate of an environmental factor relevant to the remote subject. In these examples, sending engine 216 is to, in addition to sending presence data, send to the 3D object environmental data relevant to the remote subject.

In certain examples, system 102 may include a presence data selection engine 218. Presence data selection 218 represents generally a combination of hardware and programming to receive a user directive as to which of the presence data will be used to cause the display representative of the presence factor. In this manner, users can set the system to display at a 3D object a level of information that is appropriate for the remote subject and the user. In one example, the user directive may be a directive received at server 112 or servers 114 from a human being that is the remote subject or is an occupant of a structure that is the remote subject. In a particular example, the directive may be received as an opt-in instruction or customized opt in instruction. In examples the directive may be received via a web interface accessible to the human user, or may be received via an email sent by the human remote subject that consents to the use of certain presence data for the purpose of providing the display at the 3D object, e.g., for a family member or friend.

In certain examples, system 102 may include a recipient selection engine 220. Recipient selection engine 220 represents generally a combination of hardware and programming to receive an instruction authorizing sending of the presence data to the 3D object. In this manner, users can authorize the sending of presence data to a 3D object, or set of 3D objects, that are specifically identified or approved by a human user that is the remote subject, or that is an occupant of a home or other structure that is the remote subject. In examples, the instruction may be received via a web interface accessible to the human user, or may be received via an email or other electronic means. In a particular example, the 3D object may be an off the shelf retail item, and recipient selection engine 220 may be activated as a web service via a web interface that includes a family and/or geographic mapping function.

In examples, receipt engine 214 may receive presence data, sending module sending engine 216 may send the presence data, presence data receiving engine 204 may receive the presence data, environmental presence data engine 208 may receive the environmental data, presence data selection engines 212 218 may receive a user directive, and/or recipient selection engine 220 may receive a user instruction over a link 130 utilizing a networking protocol. In examples the networking protocols utilized may include, but are not limited to, Transmission Control Protocol/Internet Protocol ("TCP/IP"), HyperText Transfer Protocol ("HTTP"), and and/or Session Initiation Protocol ("SIP").

With reference back to FIG. 1 in view of FIGS. 2A and 2B, in one example system 102 may include a 3D device component 230 that includes engines 204-213. In another example, system 102 may include a service component 240 that includes engines 214-220 operating on a server device, server devices, or any other computing device. In other examples, system 102 may have any of engines 204-213 and engines 214-220 included within, or distributed across, any one computing device or several computing devices.

In the foregoing discussion of FIGS. 2A and 2B, engines 204-220 were described as combinations of hardware and programming. Engines 204-220 may be implemented in a number of fashions. Looking at FIGS. 3A and 3B, the programming may be processor executable instructions stored on a tangible memory resource 330 and the hardware may include a processing resource 340 for executing those instructions. Thus memory resource 330 can be said to store program instructions that when executed by processing resource 340 implement system 102 of FIGS. 2A and 2B.

Memory resource 330 represents generally any number of memory components capable of storing instructions that can be executed by processing resource 340. Memory resource 330 is non-transitory in the sense that it does not encompass a transitory signal but instead is made up of more or more memory components to store the relevant instructions. Memory resource 330 may be implemented in a single device or distributed across devices. Likewise, processing resource 340 represents any number of processors capable of executing instructions stored by memory resource 330. Processing resource 340 may be integrated in a single device or distributed across devices. Further, memory resource 330 may be fully or partially integrated in the same device as processing resource 340, or it may be separate but accessible to that device and processing resource 340.

In one example, the program instructions can be part of an installation package that when installed can be executed by processing resource 340 to implement system 102. In this case, memory resource 330 may be a portable medium such as a CD, DVD, or flash drive or a memory maintained by a server from which the installation package can be downloaded and installed. In another example, the program instructions may be part of an application or applications already installed. Here, memory resource 330 can include integrated memory such as a hard drive, solid state drive, or the like.

Figure 3A:
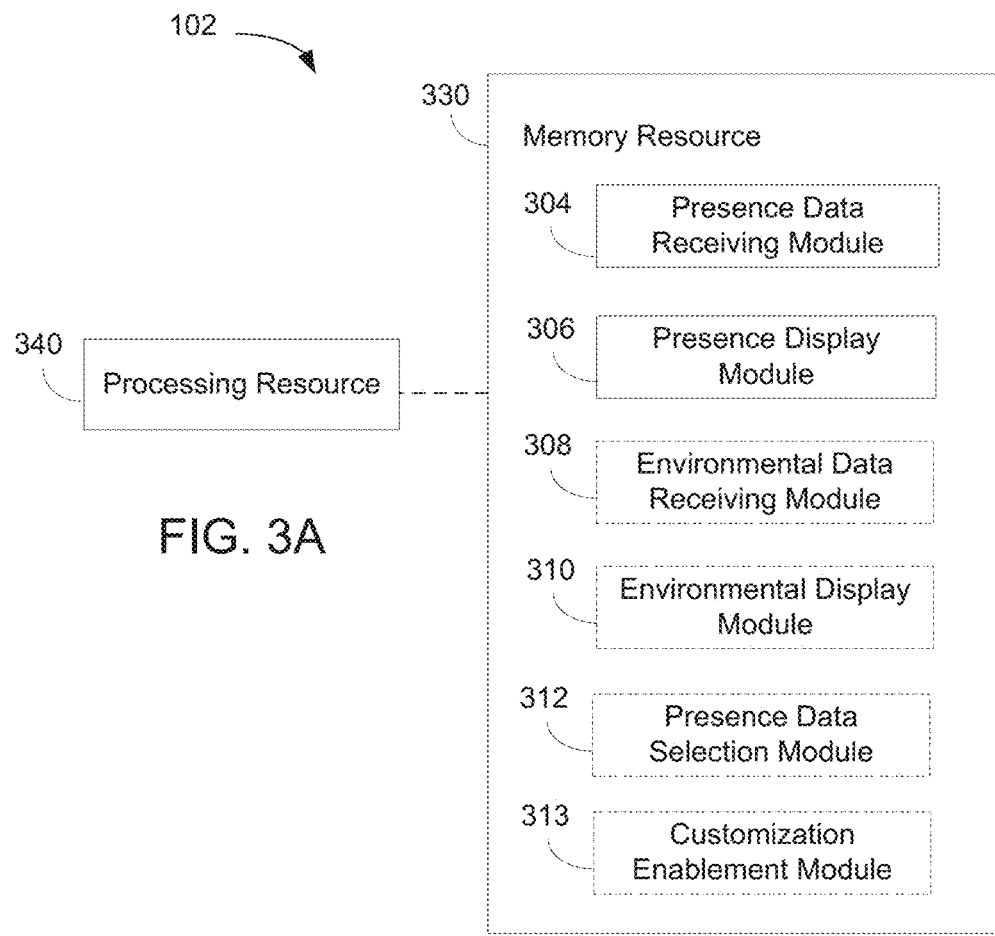
FIGS. 3A and 3B are block diagrams depicting a memory resource and a processing resource to implement examples of a system to enable displays representative of remote subjects.

In FIG. 3A, the executable program instructions stored in memory resource 330 are depicted as presence data receiving module 304, presence display module 306, environmental data receiving module 308, environmental display module 310, presence data selection module 312, and customization enablement module 313. Presence data receiving module 304 represents program instructions that when executed by processing resource 340 may perform any of the functionalities described above in relation to presence data receiving engine 204 of FIG. 2A. Presence display module 306 represents program instructions that when executed by processing resource 340 may perform any of the functionalities described above in relation to presence display engine 206 of FIG. 2A. Environmental data receiving module 308 represents program instructions that when executed by processing resource 340 may perform any of the functionalities described above in relation to environmental data receiving engine 208 of FIG. 2A. Environmental display module 310 represents program instructions that when executed by processing resource 340 may perform any of the functionalities described above in relation to environmental display engine 210 of FIG. 2A. Presence data selection module 312 represents program instructions that when executed by processing resource 340 may perform any of the functionalities described above in relation to presence data selection engine 212 of FIG. 2A. Customization enablement module 313 represents program instructions that when executed by processing resource 340 may perform any of the functionalities described above in relation to customization enablement engine 213 of FIG. 2A

Figure 3B:
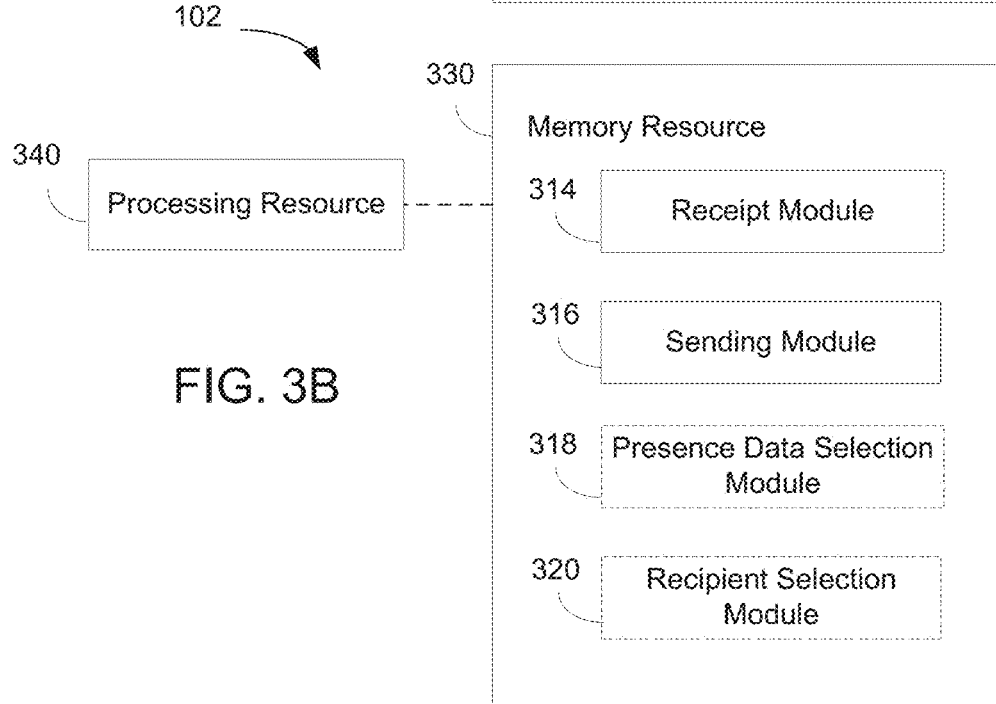

In FIG. 3B, the executable program instructions stored in memory resource 330 are depicted as receipt module 314, sending module 316, presence data selection module 318, and recipient selection module 320. Receipt module 314 represents program instructions that when executed by processing resource 340 may perform any of the functionalities described above in relation to receipt engine 214 of FIG. 2B. Sending module 316 represents program instructions that when executed by processing resource 340 may perform any of the functionalities described above in relation to sending engine 216 of FIG. 2B. Presence data selection module 318 represents program instructions that when executed by processing resource 340 may perform any of the functionalities described above in relation to presence data selection engine 218 of FIG. 2B. Recipient selection module 320 represents program instructions that when executed by processing resource 340 may perform any of the functionalities described above in relation to recipient selection engine 220 of FIG. 2B.

Figure 4:
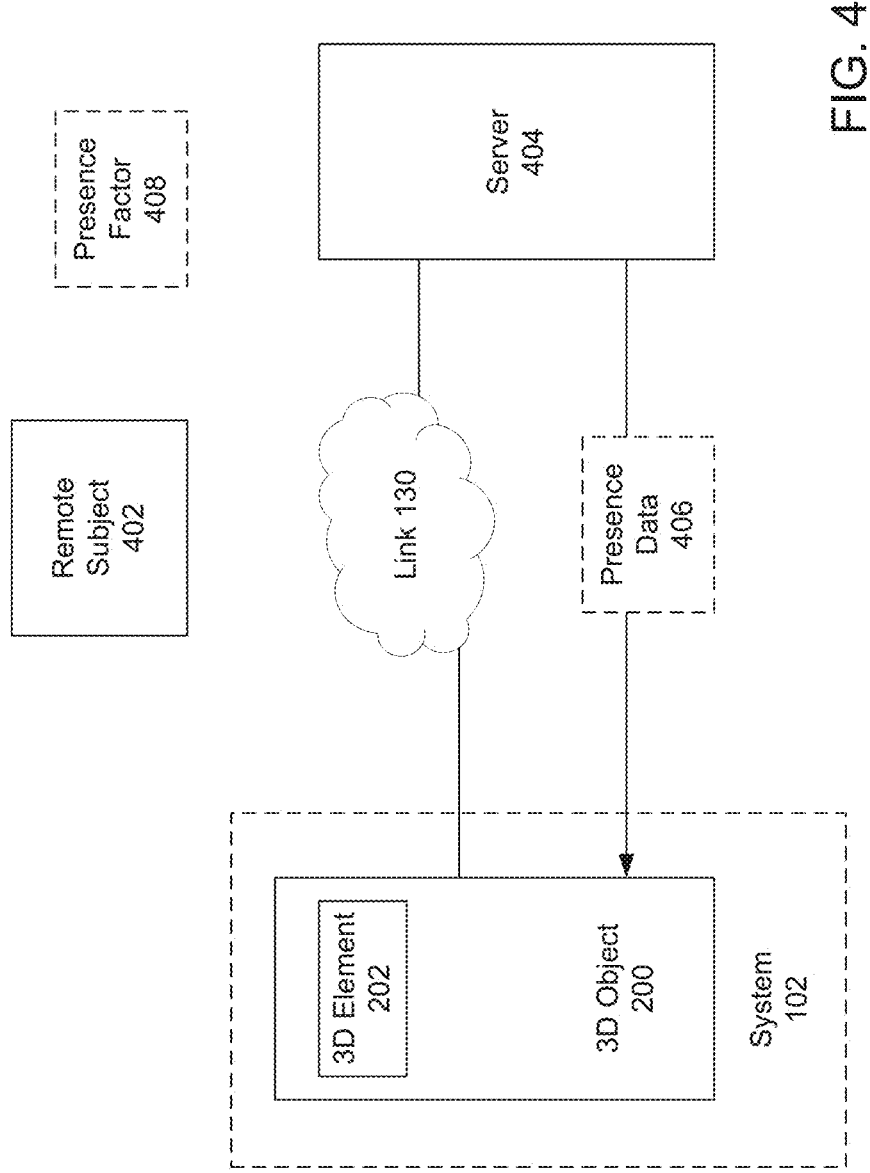
FIG. 4 illustrates an example of a system to enable displays representative of remote subjects.

FIG. 4, in view of FIGS. 2A and 2B, illustrates an example of implementation of system 102 for enabling displays representative of remote subjects. In the particular example of FIG. 4, system 102 includes a 3D object 200, with 3D object including a 3D element 202 representative of a remote subject 402. System 102 is to establish a secure connection via link 130 with a server 404. System 102 is to receive from server 404 presence data 406 indicative of a presence factor 408 for remote subject 402. System 102 is to analyze presence data 406 and cause at 3D object 200 a display representative of presence factor 408.

Figure 5:
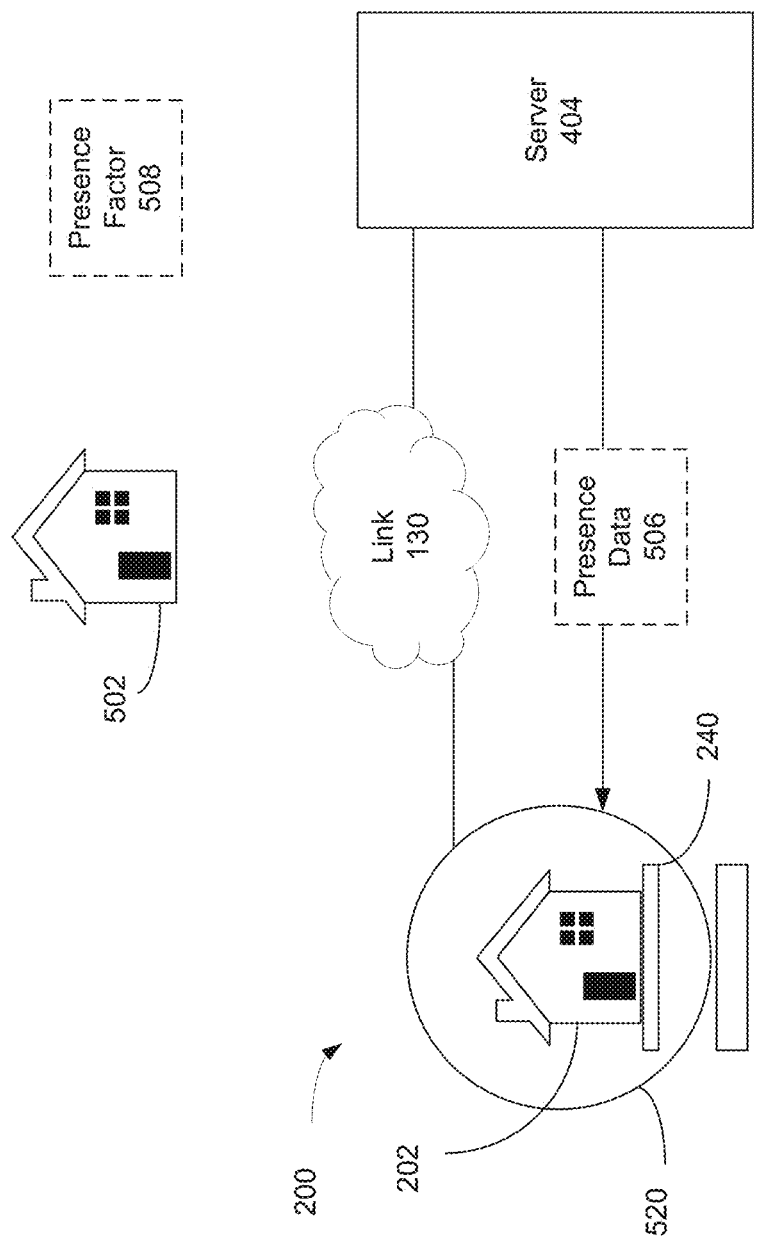
FIG. 5 illustrates an example of a system to enable displays representative of remote subjects, wherein a 3D object includes a transparent container and a 3D element representative of a remote structure.

FIG. 5, in view of FIGS. 2A and 2B illustrates another example of implementation of system 102 for enabling displays representative of remote subjects. In the particular example of FIG. 5, system 102 includes a 3D object 200, with 3D object 200 including a transparent container 520 and a 3D element 202 representative of a remote structure 502, wherein the 3D element 202 is to be situated within transparent container 520. 3D object 200 is to establish a secure connection via link 130 with a server 404. 3D object 200 is to receive from server 404 presence data 506 indicative of a presence factor 508 for remote structure 502 and environmental data indicative of weather at or near remote structure 502. System 102 is to analyze presence data 506 and cause at 3D object 200 a display representative of presence factor 508 and the environmental factor, wherein the display includes projection of text, images, or lighting upon 3D element 202. In examples the display includes projection of text, images, or lighting upon transparent container 520.

Figure 6:
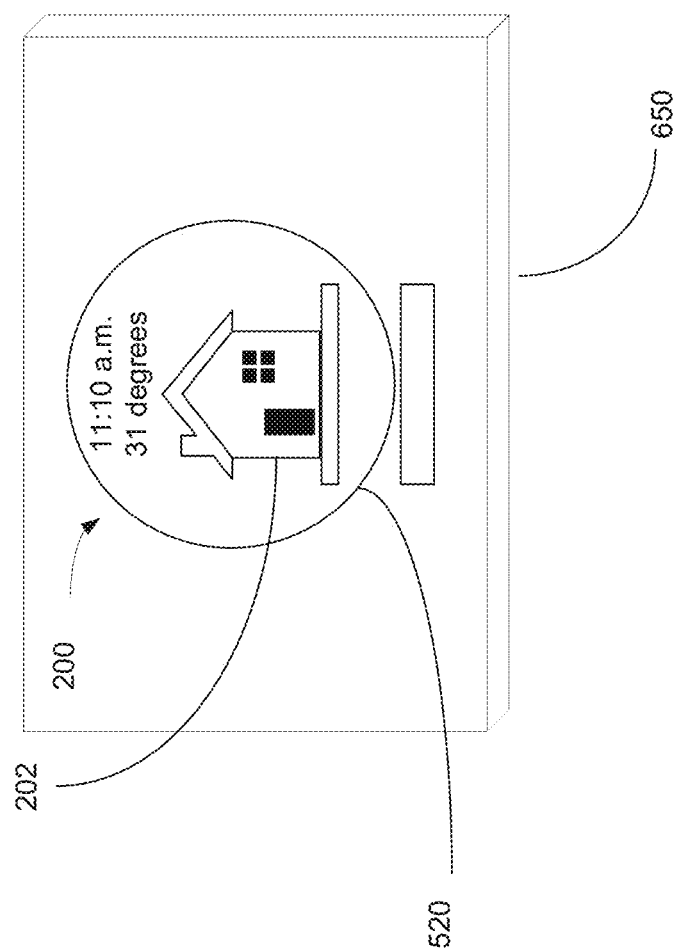
FIGS. 6 and 7 illustrate examples projection of text, images, or lighting upon a 3D element.

FIG. 6, in view of FIGS. 2A, 2B, and 5, illustrates an example of projection of text, images, or lighting upon 3D element 202, including upon transparent container 520. In this example, 3D object 202 includes transparent container 520 and 3D element 202 representative of a remote structure 502 (FIG. 5). System 102 may project text, images, or lighting upon transparent container 520, and other portions of 3D element 202, in whole or in part utilizing a projection device that is or includes a projection container 650. In the example depicted in FIG. 6 the projection device is external to 3D object 200, such that 3D object 200 is placeable into a projection container 650. In this example, projection container 650 causes lighting effects upon the 3D element 202, and also may project text indicative of time and weather upon transparent container 520.

Figure 7:
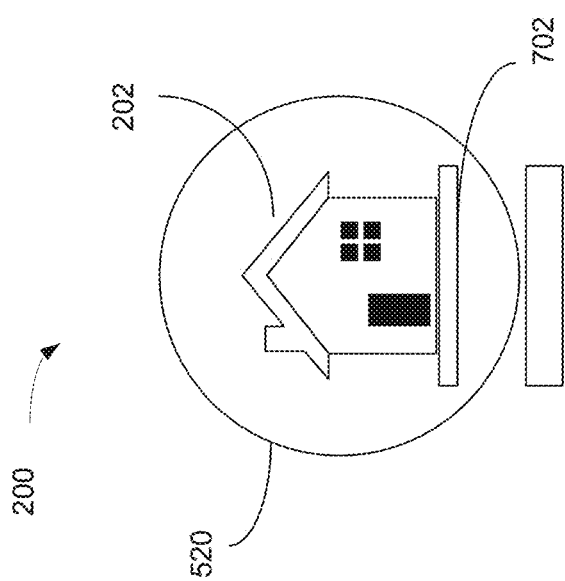

FIG. 7, in view of FIGS. 2A, 2B, and 5, illustrates another example of projection of text, images, or lighting upon 3D element 202. In this example, 3D object 202 includes transparent container 520 and 3D element 202 representative of a remote structure 502 (FIG. 5). System 102 may project text, images, or lighting upon 3D element 202, including upon transparent container 520, in whole or in part utilizing a projection device that is included within 3D object 200. In the example depicted in FIG. 7 the projection device is included in a base 702 that is part of 3D element 202. Other configurations of the projection device within 3D object 200, e.g., within the transparent container 520 yet external to 3D element 202, are possible and are contemplated by this disclosure.

Returning to FIG. 4, In examples, the connection service at server 404 may provide analytics on presence data 406, e.g. to flag anomalous data (e.g. front door left open), and/or time-shift data for users in different time zones. For instance, a user in control of a 3D object in New York City, wherein the 3D object is to display presence data for her mother in Tokyo, may choose to time-shift the presence data for the relative such that the display made during New York City evening is representative of the preceding Tokyo evening rather than current Tokyo time. In this manner the user of the 3D object in New York City may choose to view information collected at a time that for her is more likely to enhance connectedness, as opposed to a real-time display that would typically reflect that the Tokyo resident is sleeping.

Figure 8:
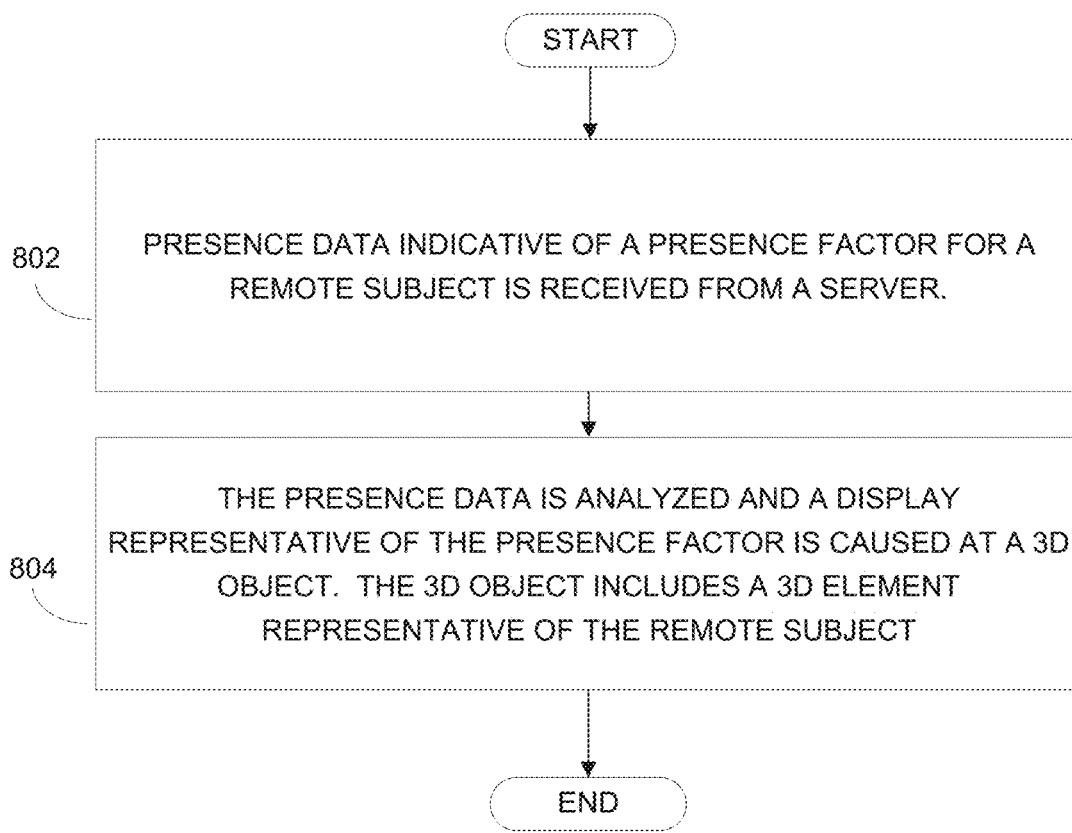
FIG. 8 is a flow diagram depicting implementation of an example of a method for enabling displays representative of remote subjects.

FIG. 8 is a flow diagram of implementation of a method to enable displays representative of remote subjects. In discussing FIG. 8, reference may be made to the components depicted in FIGS. 2B and 3B. Such reference is made to provide contextual examples and not to limit the manner in which the method depicted by FIG. 8 may be implemented. Presence data indicative of a presence factor for a remote subject is received from a server (block 802). Referring back to FIGS. 2A and 3A, presence data receiving engine 204 (FIG. 2A) or presence data receiving module 304 (FIG. 3A), when executed by processing resource 340, may be responsible for implementing block 802.

The presence data is analyzed and a display representative of the presence factor is caused at a 3D object. The 3D object includes a 3D element representative of the remote subject (block 804). Referring back to FIGS. 2A and 3A, presence display engine 206 (FIG. 2A) or presence display module 306 (FIG. 3A), when executed by processing resource 340, may be responsible for implementing block 804.

Figure 9:
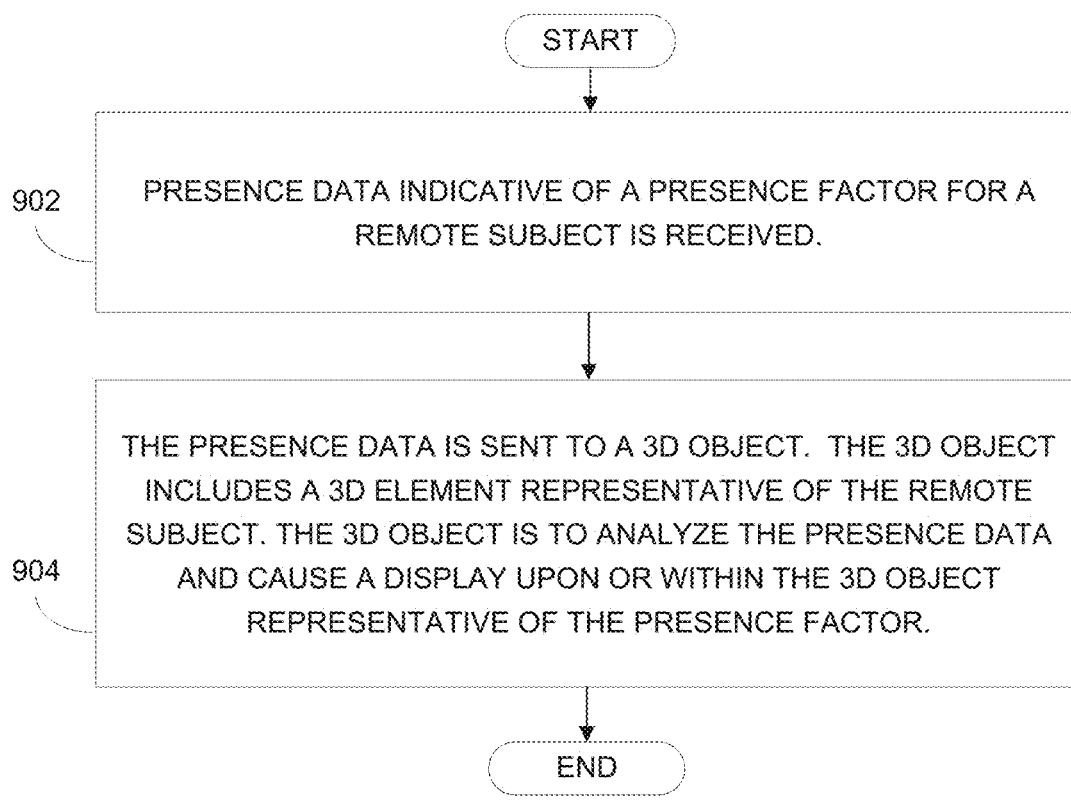
FIG. 9 is a flow diagram depicting implementation of an example of a method for enabling displays representative of remote subjects, the method including receiving presence data and sending presence data.

FIG. 9 is a flow diagram of implementation of a method to enable displays representative of remote subjects. In discussing FIG. 9, reference may be made to the components depicted in FIGS. 2B and 3B. Such reference is made to provide contextual examples and not to limit the manner in which the method depicted by FIG. 9 may be implemented. Presence data indicative of a presence factor for a remote subject is received (block 902). Referring back to FIGS. 2B and 3B, receipt engine 214 (FIG. 2B) or receipt module 314 (FIG. 3B), when executed by processing resource 340, may be responsible for implementing block 902.

The presence data is sent to a 3D object. The 3D object includes a 3D element representative of the remote subject. The 3D object is to analyze the presence data and cause a display upon or within the 3D object representative of the presence factor (block 904). Referring back to FIGS. 2B and 3B, sending engine 216 (FIG. 2B) or sending module 316 (FIG. 3B), when executed by processing resource 340, may be responsible for implementing block 904.

Figure 10:
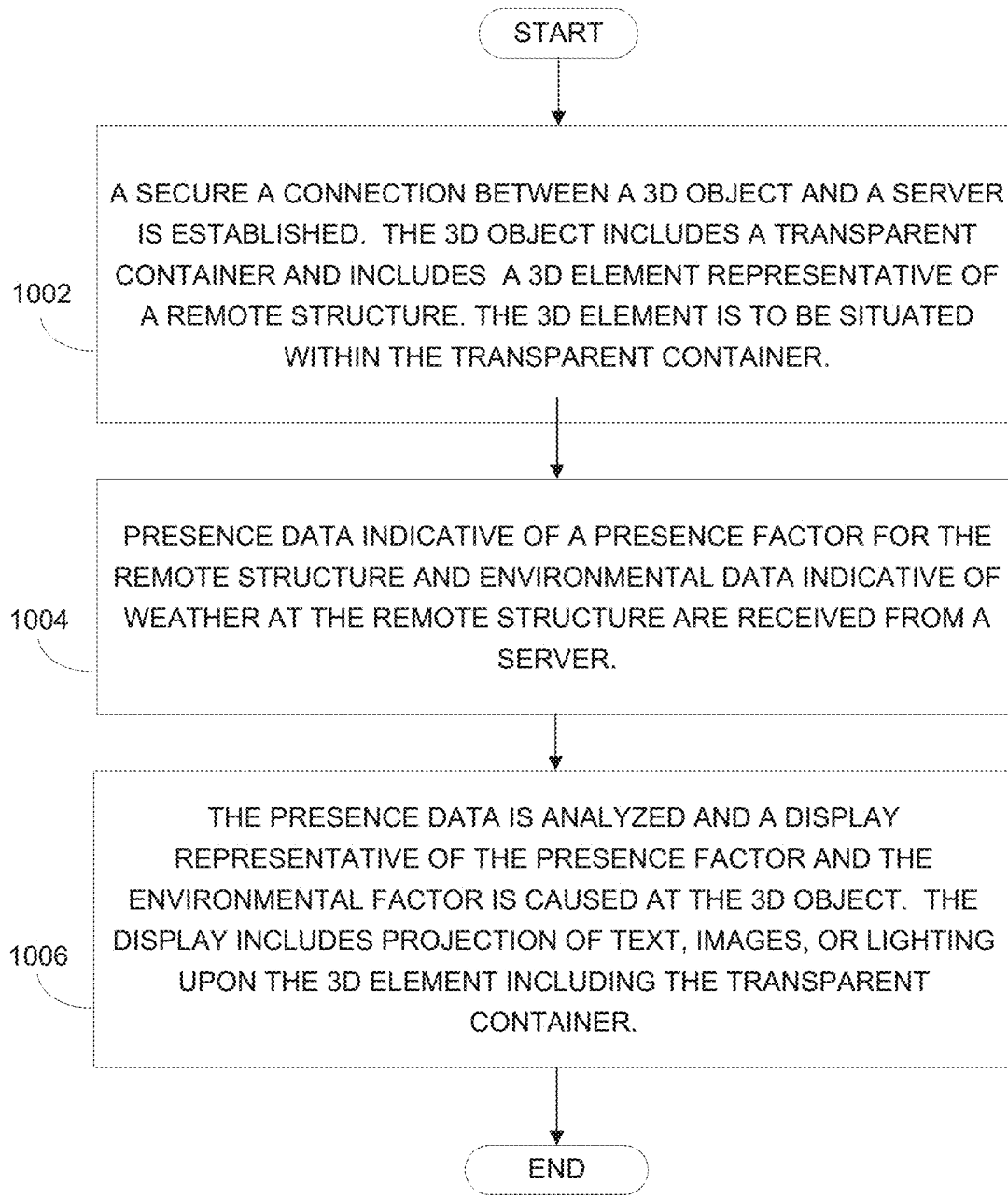
FIG. 10 is a flow diagram depicting implementation of an example of a method for enabling displays representative of remote subjects, wherein the method includes analyzing presence data and causing projection of a presence factor and environmental factor at a 3D object including a transparent container.

FIG. 10 is a flow diagram of implementation of a method to enable displays representative of remote subjects. In discussing FIG. 10, reference may be made to the components depicted in FIGS. 2A and 3A. Such reference is made to provide contextual examples and not to limit the manner in which the method depicted by FIG. 10 may be implemented. A secure a connection between a 3D object and a server is established. The 3D object includes a transparent container and includes a 3D element representative of a remote structure. The 3D element is to be situated within the transparent container (block 1002). Referring back to FIGS. 2A and 3A, presence data receiving engine 204 (FIG. 2A) or presence data receiving module 304 (FIG. 3A), when executed by processing resource 340, may be responsible for implementing block 1002.

Presence data indicative of a presence factor for the remote structure and environmental data indicative of weather at the remote structure are received from a server (block 1004). Referring back to FIGS. 2A and 3A, presence data receiving engine 204 and environmental data receiving engine 208 (FIG. 2A), or presence data receiving module 304 (FIG. 3A) and environmental data receiving module 308 (FIG. 3A), when executed by processing resource 340, may be responsible for implementing block 1004.

The presence data is analyzed and a display representative of the presence factor and the environmental factor is caused at the 3D object. The display includes projection of text, images or lighting upon the 3D element including the transparent container (block 1006). Referring back to FIGS. 2A and 3A, presence display engine 206 and environmental display engine 210 (FIG. 2A), or presence display module 306 and environmental display module 310 (FIG. 3A), when executed by processing resource 340, may be responsible for implementing block 1006.

FIGS. 1-10 aid in depicting the architecture, functionality, and operation of various examples. In particular, FIGS. 2A, 2B, 3A, and 3B depict various physical and logical components. Various components are defined at least in part as programs or programming. Each such component, portion thereof, or various combinations thereof may represent in whole or in part a module, segment, or portion of code that comprises executable instructions to implement any specified logical function(s). Each component or various combinations thereof may represent a circuit or a number of interconnected circuits to implement the specified logical function(s). Examples can be realized in any memory resource for use by or in connection with processing resource. A "processing resource" is an instruction execution system such as a computer/processor based system or an ASIC (Application Specific Integrated Circuit) or other system that can fetch or obtain instructions and data from computer-readable media and execute the instructions contained therein. A "memory resource" is any non-transitory storage media that can contain, store, or maintain programs and data for use by or in connection with the instruction execution system. The term "non-transitory" is used only to clarify that the term media, as used herein, does not encompass a signal. Thus, the memory resource can comprise any one of many physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory, flash drives, and portable compact discs.

Although the flow diagrams of FIGS. 8-10 show specific orders of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present disclosure.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein. All of the features disclosed in this specification (including any accompanying claims, abstract and drawings), and/or all of the blocks or stages of any method or process so disclosed, may be combined in any combination, except combinations where at least some of such features, blocks and/or stages are mutually exclusive.

What is claimed is:
1. A system to enable displays representative of remote subjects, comprising:
a three-dimensional (3D) object comprising a 3D element representative of a user of a remote electronic device, wherein the 3D element is shaped to represent an anatomical feature of the user of the remote electronic device;
a processor; and
a memory comprising code that is executable by the processor to:
receive from a server presence data indicative of a presence factor for the remote electronic device, wherein the presence factor corresponds with an activity or attribute of the user of the remote electronic device;
time-shift the presence factor by an amount of time equal to a difference between a first time zone of the 3D object and a second time zone of the remote electronic device to delay a display of the presence factor by the amount of time; and
analyze the presence data and generate, at the 3D object, the display representative of the presence factor.

2. The system of claim 1, wherein the presence factor corresponds with a health-related attribute of the user of the remote electronic device.

3. The system of claim 1, wherein the presence factor indicates an availability of the user of the remote electronic device for an electronic conversation.

4. The system of claim 1, wherein the presence factor indicates weather conditions at a location of the user of the remote electronic device.

5. The system of claim 1, wherein to generate the display representative of the presence factor comprises to project a lighting effect on the 3D object.

6. The system of claim 1, wherein to generate the display representative of the presence factor comprises to engage an actuator to move the 3D element.

7. The system of claim 1, wherein the 3D element is a model of a human head and to move the 3D element comprises to move the model to a downward angle.

8. The system of claim 1, wherein the 3D object is a doll figure and the 3D element is a representation of a head of the user, wherein the presence factor is an availability of the user for electronic conversation, and to generate at the 3D object the display representative of the presence factor comprises:
move the head to a forward facing position to indicate that the user of the remote electronic device was available for an electronic conversation; and
move the head to a turned-away position or turned-down position to indicate that the user of the remote electronic device was unavailable for an electronic conversation.

9. The system of claim 1, wherein the 3D element comprises a custom 3D printed facsimile of the user of the remote electronic device.

10. A method generating a display representative of a remote user, comprising:
establishing a secure a connection between a 3D object and a server, wherein the 3D object comprises a 3D element shaped to represent an anatomical feature of a user of a remote electronic device;
receiving from a server presence data indicative of a presence factor for the user of the remote electronic device, wherein the presence factor corresponds with an activity or attribute of the user of the remote electronic device;
time-shifting the presence factor by an amount of time equal to a difference between a first time zone of the 3D object and a second time zone of the remote electronic device to delay a display of the presence factor by the amount of time; and
generating, at the 3D object, the display representative of the presence factor.

11. The method of claim 10, wherein the presence factor corresponds with a health-related attribute of the user of the remote electronic device.

12. The method of claim 10, wherein the presence factor indicates an availability of the user of the remote electronic device for an electronic conversation.

13. The method of claim 10, wherein the presence factor indicates weather conditions at a location of the user of the remote electronic.

14. The method of claim 10, wherein to generate the display representative of the presence factor comprises to project a lighting effect on the 3D object.

15. The method of claim 10, wherein to generate the display representative of the presence factor comprises to engage an actuator to move the 3D element.

16. The method of claim 10, wherein the 3D element is a model of a human head and to move the 3D element comprises to move the model to a downward angle.

17. The method of claim 10, wherein the 3D object is a doll figure and the 3D element is a representation of a head of the user, wherein the presence factor is an availability of the user for electronic conversation, and to generate at the 3D object the display representative of the presence factor comprises:
move the head to a forward facing position to indicate that the user of the remote electronic device was available for an electronic conversation; and
move the head to a turned-away position or turned-down position to indicate that the user of the remote electronic device was unavailable for an electronic conversation.

18. A non-transitory computer-readable medium storing instructions that, when executed, direct a processor to generate a display at a three-dimensional (3D) object comprising a 3D element representative of a user of a remote electronic device, wherein the 3D element is shaped to represent an anatomical feature of the user of the remote electronic device, the instructions to direct the processor to:
receive from a server presence data indicative of a presence factor for the remote electronic device, wherein the presence factor corresponds with an activity or attribute of the user of the remote electronic device;
time-shift the presence factor by an amount of time equal to a difference between a first time zone of the 3D object and a second time zone of the remote electronic device to delay a display of the presence factor by the amount of time; and
analyze the presence data and generate, at the 3D object, the display representative of the presence factor.

19. The non-transitory computer-readable medium of claim 18, wherein the presence factor indicates an availability of the user of the remote electronic device for an electronic conversation.

20. The non-transitory computer-readable medium of claim 18, wherein the 3D object is a doll figure and the 3D element is a representation of a head of the user, wherein the presence factor is an availability of the user for electronic conversation, and to generate at the 3D object the display representative of the presence factor comprises:
move the head to a forward facing position to indicate that the user of the remote electronic device was available for an electronic conversation; and move the head to a turned-away position or turned-down position to indicate that the user of the remote electronic device was unavailable for an electronic conversation.

* * * * *